(12) United States Patent
Ishibashi et al.

(10) Patent No.: US 11,309,609 B2
(45) Date of Patent: Apr. 19, 2022

(54) BATTERY MODULE, AND VEHICLE EQUIPPED WITH SAME

(71) Applicant: SANYO Electric Co., Ltd., Daito (JP)

(72) Inventors: Kengo Ishibashi, Hyogo (JP); Shinichi Mitsubori, Kanagawa (JP); Shinobu Terauchi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 65 days.

(21) Appl. No.: 16/632,722

(22) PCT Filed: Jul. 5, 2018

(86) PCT No.: PCT/JP2018/025429
§ 371 (c)(1),
(2) Date: Jan. 21, 2020

(87) PCT Pub. No.: WO2019/021777
PCT Pub. Date: Jan. 31, 2019

(65) Prior Publication Data
US 2021/0151829 A1    May 20, 2021

(30) Foreign Application Priority Data

Jul. 27, 2017 (JP) ............................. JP2017-145917

(51) Int. Cl.
*H01M 50/209* (2021.01)
*H01M 50/249* (2021.01)
*H01M 50/507* (2021.01)

(52) U.S. Cl.
CPC ....... *H01M 50/209* (2021.01); *H01M 50/249* (2021.01); *H01M 50/507* (2021.01); *H01M 2220/20* (2013.01)

(58) Field of Classification Search
CPC ............. H01M 50/209; H01M 50/429; H01M 50/507; H01M 2220/20; H01M 50/20; Y02E 60/10
See application file for complete search history.

(56) References Cited

U.S. PATENT DOCUMENTS

| | | | |
|---|---|---|---|
| 9,537,125 B2* | 1/2017 | Park | H01M 50/20 |
| 2007/0026305 A1* | 2/2007 | Jeon | H01M 50/20 |
| | | | 429/159 |

(Continued)

FOREIGN PATENT DOCUMENTS

| | | |
|---|---|---|
| CN | 105895838 A | 8/2016 |
| JP | 2012-14962 A | 1/2012 |

(Continued)

OTHER PUBLICATIONS

International Search Report dated Sep. 4, 2018, issued in counterpart PCT/JP2018/025429 (2 pages).

(Continued)

*Primary Examiner* — Michael L Dignan
(74) *Attorney, Agent, or Firm* — Westerman, Hattori, Daniels & Adrian, LLP

(57) ABSTRACT

A pair of end plates of a battery module are disposed respectively at end faces of a battery stack. Each of the end plates includes a first metal sheet, a second metal sheet, and a metal rod. The first metal sheet includes a plate part corresponding to a shape of each of the end faces of the battery stack, and a bent side piece provided at each of widthwise sides of the plate part. The second metal sheet includes a parallel plate part stacked on and fixed to the plate part of the first metal sheet, and a bending ridge that connects with each of sides of the parallel plate part and extends along widths of the end plates. A tubular reinforcement is defined on an inner side of the bending ridge. A metal rod is disposed in the tubular reinforcement and has ends connected to the bind bar.

11 Claims, 11 Drawing Sheets

(56) References Cited

U.S. PATENT DOCUMENTS

| | | | |
|---|---|---|---|
| 2011/0117409 A1* | 5/2011 | Lee | H01M 50/20 |
| | | | 429/99 |
| 2012/0003526 A1 | 1/2012 | Kume et al. | |
| 2012/0315508 A1* | 12/2012 | Kurita | H01M 10/486 |
| | | | 429/7 |
| 2013/0273404 A1 | 10/2013 | Ochi et al. | |
| 2014/0295227 A1* | 10/2014 | Aoki | H01M 50/20 |
| | | | 429/82 |
| 2016/0240827 A1* | 8/2016 | Sakurai | H01M 50/20 |
| 2017/0062783 A1* | 3/2017 | Kim | H01M 50/209 |
| 2017/0244091 A1* | 8/2017 | Yuasa | H01G 11/10 |
| 2018/0138560 A1* | 5/2018 | Bessho | H01M 10/6557 |

FOREIGN PATENT DOCUMENTS

| | | |
|---|---|---|
| JP | 2012-79510 A | 4/2012 |
| JP | 2016-91871 A | 5/2016 |
| JP | 2016-149244 A | 8/2016 |
| JP | 6096714 B2 | 3/2017 |
| WO | 2012/057322 A1 | 5/2012 |

OTHER PUBLICATIONS

English Translation of Search Report dated Dec. 21, 2021, issued in counterpart CN Application No. 201880048780.3. (3 pages).

* cited by examiner

BATTERY MODULE, AND VEHICLE EQUIPPED WITH SAME

TECHNICAL FIELD

The present invention relates to a battery module that includes bind bars connecting end plates disposed respectively at ends of a battery stack which includes a plurality of stacked prismatic battery cells. The present invention also relates to a vehicle including this battery module.

BACKGROUND ART

A typical battery module includes a battery stack including a plurality of prismatic battery cells, a pair of end plates disposed respectively at end faces of the battery stack, and bind bars connecting the pair of end plates (refer to PTL 1). The battery stack of this battery module is bound by the end plates and the bind bars, so that expansion of the prismatic battery cells of the battery stack can be suppressed.

On the other hand, with recent demand for a battery module having a higher energy density per volume and a higher energy density per weight, even prismatic battery cells having a higher energy density per volume and a higher energy density per weight are desirably adopted for a battery module.

CITATION LIST

Patent Literature

PTL 1: International Publication No. WO 2012/057322

SUMMARY OF THE INVENTION

When having the higher energy density per volume and the higher energy density per weight, the prismatic battery cells tend to experience a great dimensional change associated with charge and discharge or degradation. In order to suppress expansion of the prismatic battery cells that experience a great dimensional change associated with charge and discharge or degradation, the prismatic battery cells need to be bound together with relatively great force.

However, each of the end plates of the battery module described in PTL 1 is composed of a plastic body part and a metal plate made of, for example, aluminum. When great force is applied, the body part is likely to be damaged, or the metal plate is likely to be deformed. If the end plates are damaged or deformed, the expansion of the prismatic battery cells cannot be suppressed.

The present invention has been developed for the purpose of solving the above drawback, and one object of the present invention is to provide a technique that suppresses expansion of prismatic battery cells by use of sufficiently strong end plates.

A battery module according to one aspect of the present invention includes a battery stack that includes a plurality of prismatic battery cells stacked in a direction along their thicknesses, a pair of end plates disposed respectively at end faces of the battery stack that face in a stacked direction, and a bind bar connected to the pair of end plates. Each of the pair of end plates includes a first metal sheet and a second metal sheet that are partly stacked in fixed relation, and a metal rod disposed between the first metal sheet and the second metal sheet. The first metal sheet includes a plate part having an outline corresponding to a shape of each of the end faces of the battery stack, and a bent side piece provided at each of widthwise sides of the plate part. The second metal sheet includes a parallel plate part stacked on and fixed to the plate part of the first metal sheet, and a bending ridge connecting with each of sides of the parallel plate part and extending along widths of the pair of end plates. With the parallel plate part fixed to the plate part, a tubular reinforcement is defined on an inner side of the bending ridge and extends along the widths of the pair of end plates. The metal rod is disposed in the tubular reinforcement and has ends that are each connected to the bind bar.

A battery module according to another aspect of the present invention includes a battery stack that includes a plurality of prismatic battery cells stacked in a direction along their thicknesses, a pair of end plates 3 disposed respectively at end faces of the battery stack that face in a stacked direction, and a bind bar connected to the pair of end plates. Each of the pair of end plates includes a first metal sheet and a second metal sheet that are partly stacked in fixed relation. The first metal sheet includes a plate part having an outline corresponding to a shape of each of the end faces of the battery stack, and a bent side piece that is provided at each of widthwise sides of the plate part and is connected to the bind bar. The second metal sheet includes a plurality of parallel plate parts stacked on and fixed to the plate part of the first metal sheet and a plurality of bending ridges that are each disposed between the parallel plate parts and extend along widths of the pair of end plates. With parallel plate parts of the second metal sheet fixed to the plate part of the first metal sheet a tubular reinforcement is defined by the plate part of the first metal sheet and each of the bending ridges of the second metal sheet and extends along the widths.

A vehicle including the battery module with the constituent elements according to each of the above aspects is also effective as another aspect of the present invention.

According to the one aspect, the first metal sheet of the battery module has the bent side pieces that are provided respectively at the sides of the plate part for connection to the bind bars, thus having high strength against vertical bending of the first metal sheet. The second metal sheet has the bending ridges provided respectively at the sides of the parallel plate part, thus having high strength against widthwise bending of the second metal sheet. With the parallel plate part of the second metal sheet fixed to the plate part of the first metal sheet, the tubular reinforcement is defined on the inner side of the bending ridge, so that the end plate has high strength against vertical and widthwise bending of the end plate. Moreover, the metal rod is disposed in the tubular reinforcement, so that the strength of the end plate against the widthwise bending of the end plate is extremely high. According to the above structure, the end plate that can be provided is sufficiently strong. Therefore, expansion of the prismatic battery cells can be suppressed.

According to another aspect, the first metal sheet of the battery module has the bent side pieces that are provided respectively at the sides of the plate part for connection to the bind bars, thus having high strength against vertical bending of the first metal sheet. The second metal sheet has the plurality of bending ridges, each between the parallel plate parts and thus has high strength against widthwise bending of the second metal sheet. With the parallel plate parts of the second metal sheet fixed to the plate part of the first metal sheet, the tubular reinforcement is defined on an inner side of each of the bending ridges, so that the end plate has high strength against vertical and widthwise bending of the end plate. According to the above structure, the end plate that can be provided is sufficiently strong. Therefore, expansion of the prismatic battery cells can be suppressed.

DESCRIPTION OF EMBODIMENTS

Figure 1:
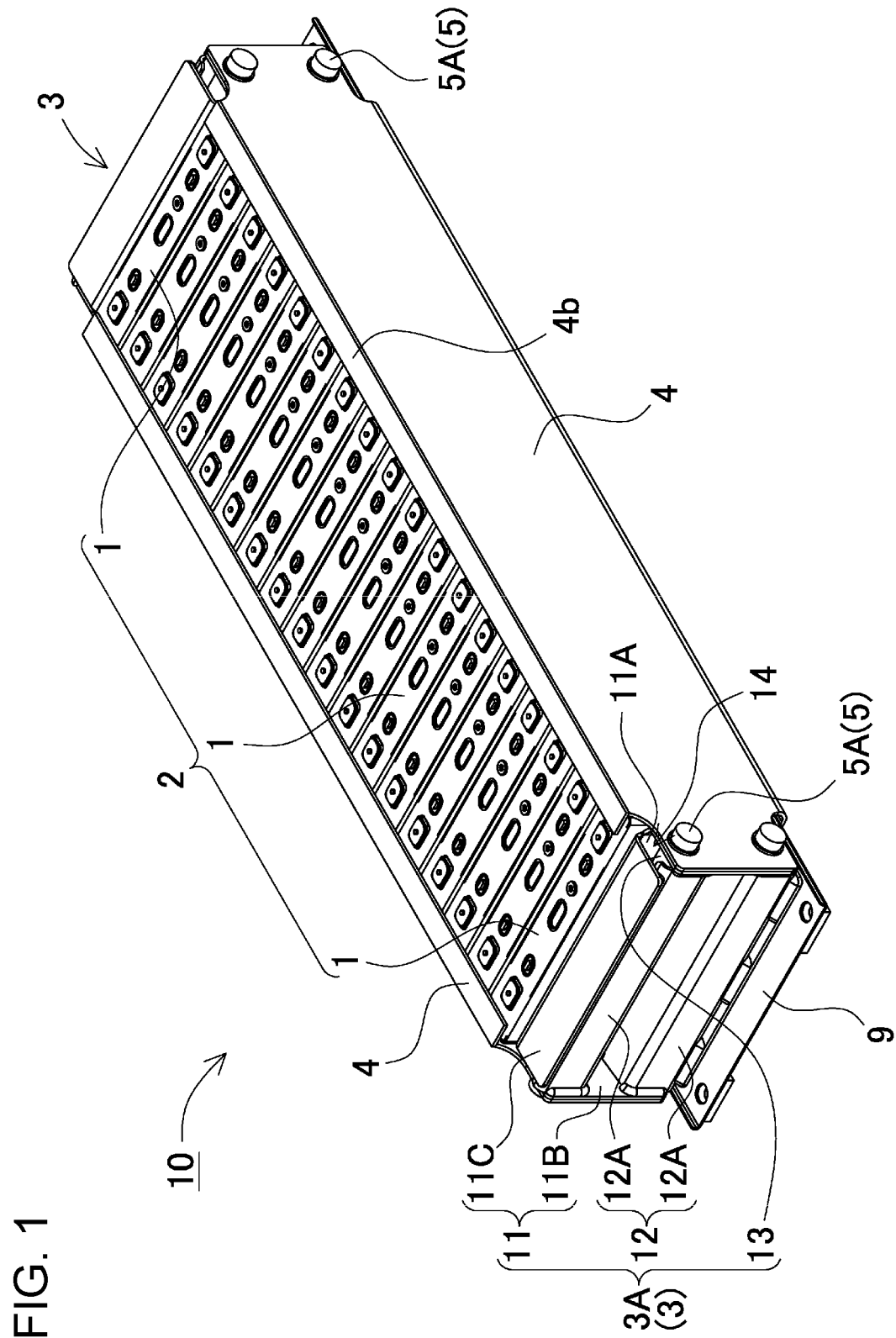
FIG. 1 is a perspective view of a battery module according to a first exemplary embodiment of the present invention.

A description is provided first of a point on which the present invention focuses. A battery module including a plurality of prismatic battery cells has end plates disposed respectively at end faces of a battery stack that includes the plurality of stacked prismatic battery cells. The pair of end plates are connected by bind bars, so that the battery stack is immobilized or fixed with pressure being applied to the battery stack in a stacked direction. In this battery module, the pair of end plates apply the pressure to the end faces of the battery stack to immobilize the battery stack and therefore are required to be sufficiently strong. The end plates experience cell reaction force at their respective inner surfaces when the prismatic battery cells expand during charge and discharge. The end plates are pressed from inside by the expanding battery stack, thus experiencing the cell reaction force that is proportional to a product of an area of the battery stack and pressing force of the battery stack. Therefore, those prismatic battery cells experiencing a great dimensional change associated with, for example, charge and discharge cause the cell reaction force as great as their expansion to act on the end plates. The cell reaction force that acts on the end plates is, for example, as extremely great as several tons in a battery module which is used as a power source to drive a traction motor of a vehicle. Therefore, what is needed to obtain a battery module with high energy density is to provide end plates that are strong enough to suppress deformation even when such extremely great force is applied.

On the other hand, the end plates are required to have both characteristics of being strong and lightweight. For this reason, when the end plate is manufactured, there are cases where a thick plate is molded out of plastic and has an outer surface on which a metal plate made of, for example, aluminum is stacked, or cases where the end plate is molded entirely out of, for example, aluminum or plastic. The plastic part of the end plate has low strength, and even the metal plate does not have high strength against bending deformation. For this reason, while this end plate can be used in a battery module with insignificant cell reaction force, this end plate cannot deliver sufficient strength in a battery module with great cell reaction force. The end plate that is not sufficiently strong gets deformed by the great cell reaction force. When deformed, the end plate causes a change to relative positions of the prismatic battery cells to which the end plates apply the pressure to immobilize. The prismatic battery cells have bus bars that are thick metal plates fixed to electrode terminals, and are connected in series or parallel via the bus bars. When the shift is caused to the relative positions, excessive straining force acts on those parts where the electrode terminals connect with the bus bars. The straining force damages the parts where the electrode terminals connect with the bus bars and also damages parts where the electrode terminals connect with an exterior case of each of the prismatic battery cells. With end plates having sufficient strength, the shift that may be caused to the relative positions of the prismatic battery cells can be improved. By being entirely a metal block made of, for example, an iron alloy, the end plate can have the sufficient strength.

However, the end plate having this structure is very heavy, consequently causes a decline in energy density of a battery module and thus cannot be put to practical use. The end plate is required to have high strength while being lightweight. However, the characteristic of being lightweight and the characteristic of being strong are contrary to each other, so that it is very difficult to achieve both these characteristics.

Exemplary embodiments of the present invention are hereinafter described with reference to the drawings. It is to be noted, however, that the exemplary embodiments described below are illustrations each embodying a technical idea of the present invention, and the present invention is not specifically limited to the following exemplary embodiments. Those members described in the claims of this specification are not specifically limited to members described in the exemplary embodiments. Unless otherwise specified, particulars including dimensions, materials, shapes, and relative positions of the members described in each of the exemplary embodiments are described as being mere examples and not as being restrictive of the present invention. The sizes, the relative positions, and others of the members may be illustrated exaggeratedly in the drawings for clear explanation. Members that are identical or of the same quality have the same name and the same reference mark in the following description, and detailed descriptions of these members are omitted where appropriate. A single member may be configured to serve as a plurality of elements of the present invention. On the other hand, a function of a single element of the present invention may be achieved by a plurality of members. Contents described in some examples or some of the exemplary embodiments can be used, for example, in the other examples or exemplary embodiments. A vertical direction described in the specification is specified in the drawings.

First Exemplary Embodiment

Figure 2:
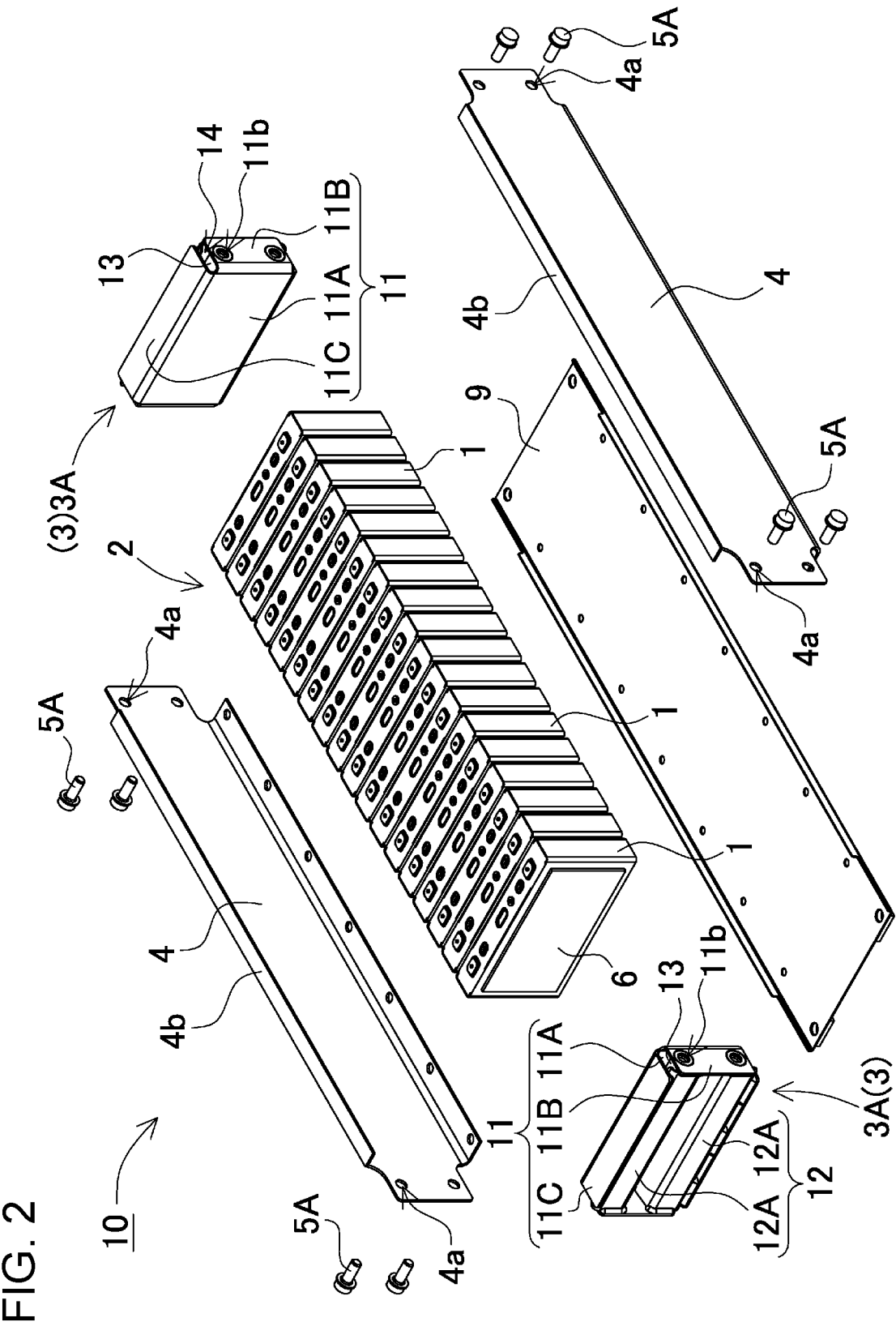
FIG. 2 is an exploded perspective view of the FIG. 1 battery module.
Figure 3:
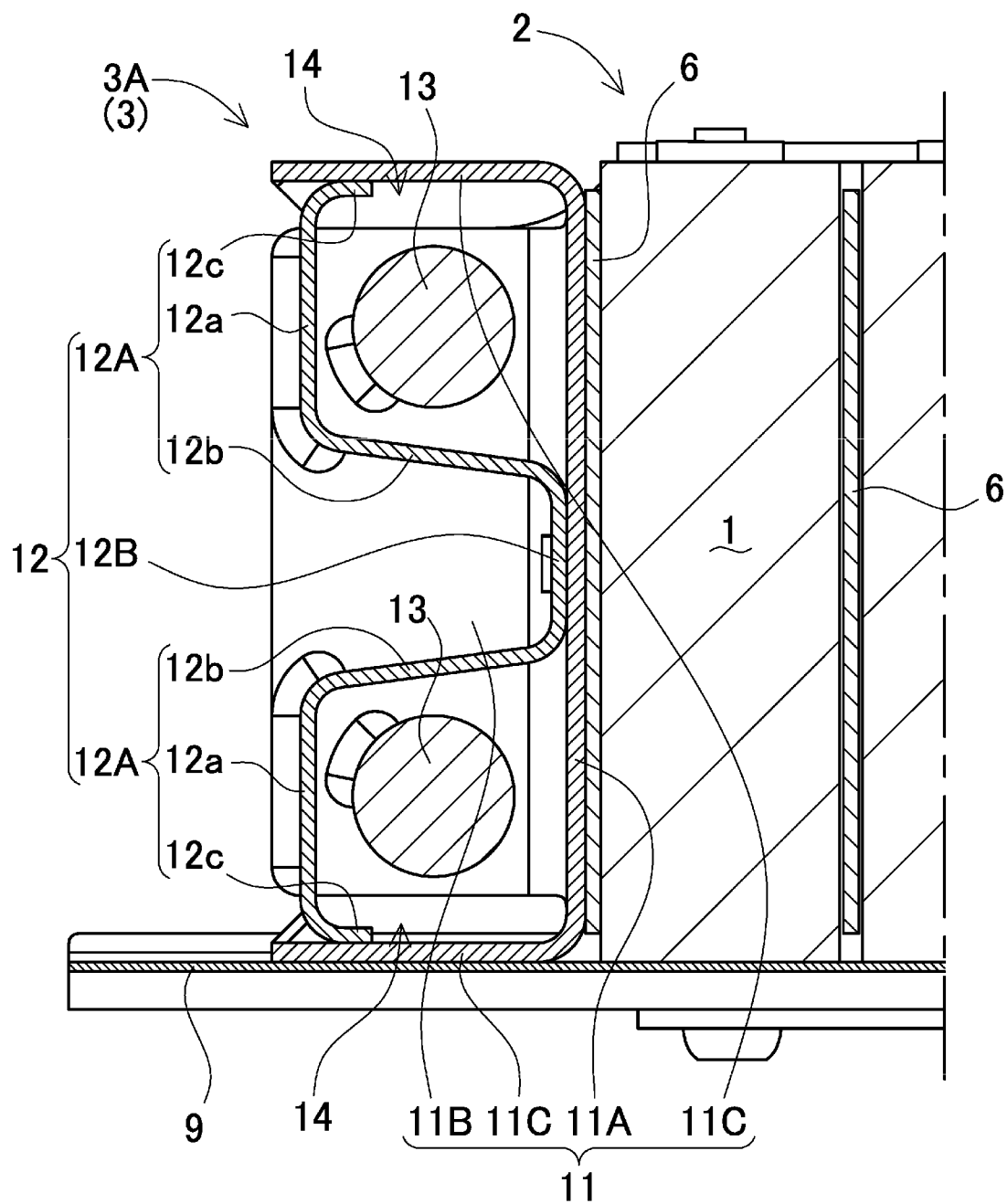
FIG. 3 is an enlarged vertical section of an end plate of the FIG. 1 battery module.
Figure 4:
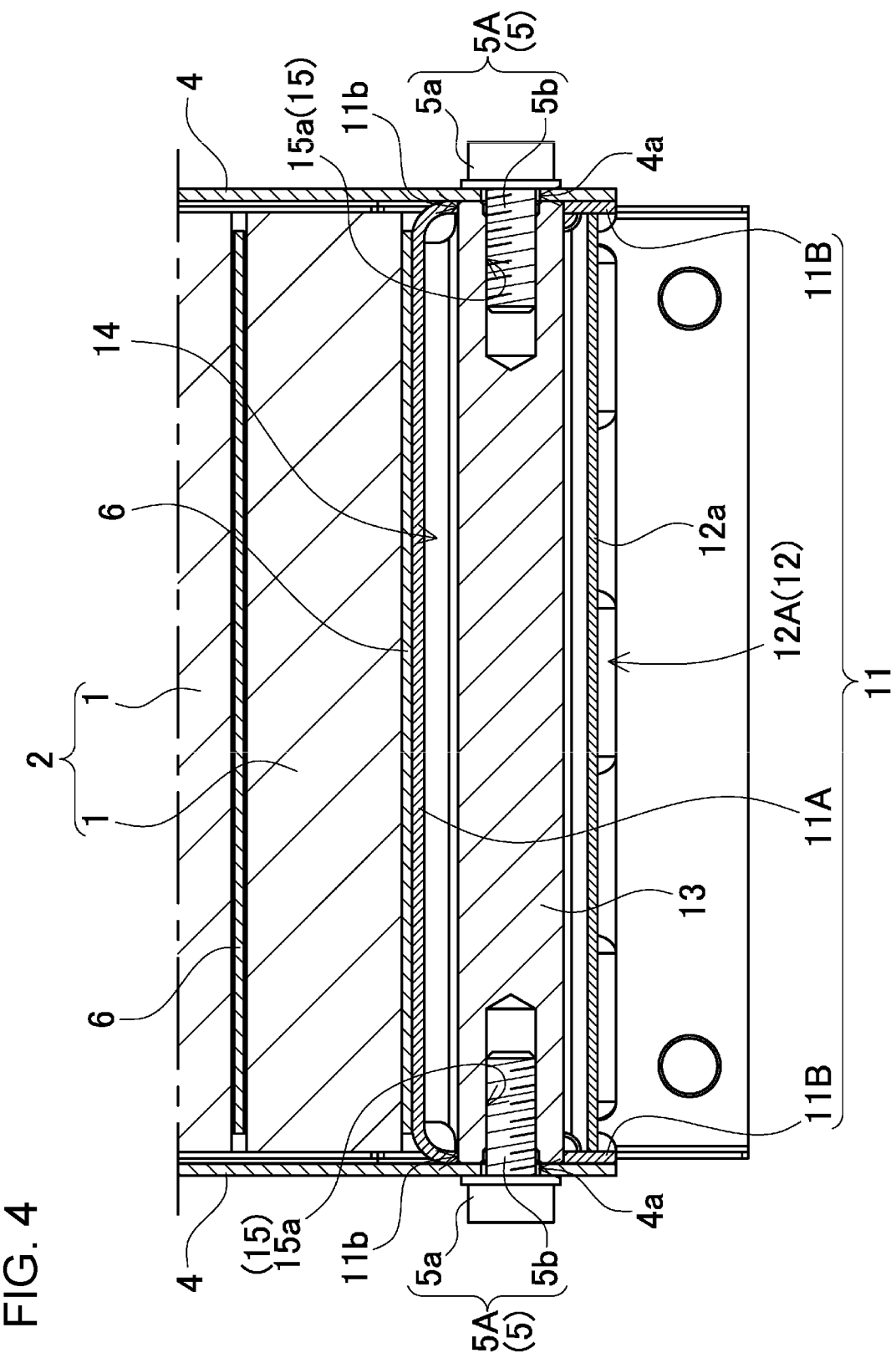
FIG. 4 is an enlarged horizontal section of the end plate of the FIG. 1 battery module.
Figure 5:
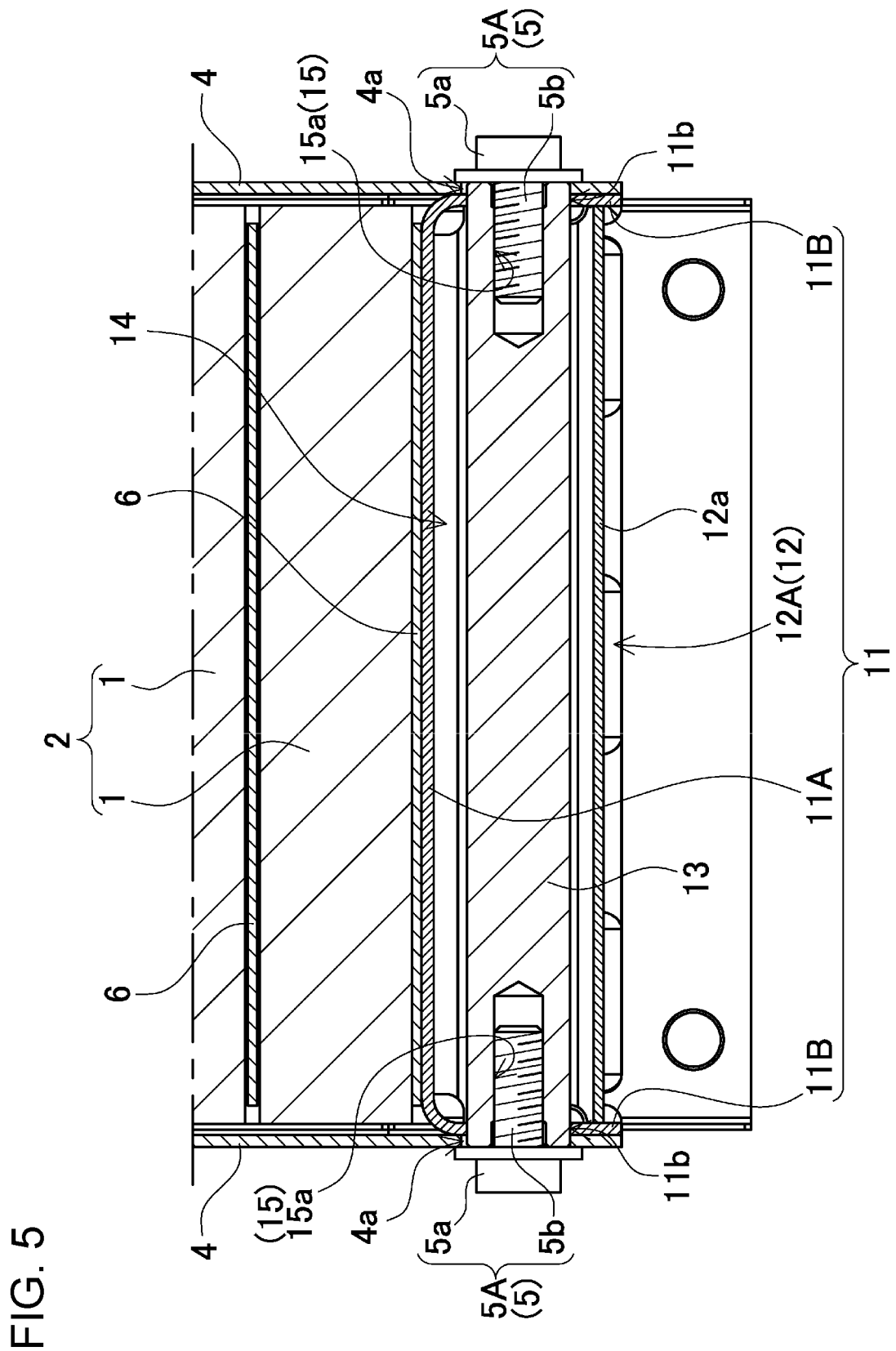
FIG. 5 is a horizontal section illustrating an end plate connected to bind bars in another example.

FIGS. 1 to 4 illustrate battery module 10 according to the first exemplary embodiment. FIG. 1 is a perspective view of the battery module. FIG. 2 is an exploded perspective view of the battery module. FIG. 3 is a vertical section of an end of the battery module taken on a vertical plane. FIG. 4 is a horizontal section of the battery module's end taken on a horizontal plane. FIG. 5 is a horizontal section illustrating another example in which an end plate is fixed to bind bars differently from that of the FIG. 4 battery module.

Battery module 10 illustrated in these drawings includes battery stack 2 that includes a plurality of prismatic (=rectangular) battery cells 1 stacked with each of separators 6 made of insulating material being put between prismatic battery cells 1, a pair of end plates 3 holding battery stack 2 in position respectively at end faces of battery stack 2, bind bars 4 connecting the pair of end plates 3, and bolts 5A that are securing pins 5 fixing bind bars 4 to end plates 3.

As illustrated in FIG. 1, above battery module 10 has the shape of an elongated box as a whole. The plurality of prismatic battery cells 1 are stacked to form battery stack 2. Battery stack 2 is held by end plates 3 at its end faces facing in a stacked direction, and each of bind bars 4 connects end plates 3 at its ends. Thus battery stack 2 is immobilized or fixed with pressure being applied to battery stack 2.

Battery stack 2 has those stacked prismatic battery cells 1 connected in series, in parallel, or in series and parallel via bus bars (not illustrated) that are metal plates.

An exterior can of each of prismatic battery cells 1 has a rectangular outline, has a greater width than its thickness and has an opening closed with a seal plate. The seal plate is provided with a positive and a negative electrode terminal that connect with the bus bars. A battery module having prismatic battery cells 1 connected in series can increase output voltage to increase output, while a battery module having prismatic battery cells 1 connected in parallel can increase current capacity. Prismatic battery cell 1 is a non-aqueous electrolyte secondary battery such as a lithium-ion rechargeable battery. However, the prismatic battery cell may even be any other secondary battery that is currently available, such as a nickel metal hydride battery or a nickel-cadmium battery, or any secondary battery that is to be developed.

The pair of end plates 3 disposed respectively at the end faces of battery stack 2 are connected to bind bars 4 and hold battery stack 2 while applying the pressure to battery stack 2, so that the pair of end plates 3 experience cell reaction force when prismatic battery cells 1 expand. To be strong enough to withstand the cell reaction force, end plate 3A illustrated in FIGS. 2 to 5 has first metal sheet 11 and second metal sheet 12 that are stacked in fixed relation and is reinforced with metal rods 13. First metal sheet 11 and second metal sheet 12 are each made by pressing a sheet made of metal such as iron or an iron alloy. Metal rod 13 is also made of metal such as iron or an iron alloy and is a cylindrical metal rod in the drawings. However, a hollow metal pipe is also usable as the metal rod.

First metal sheet 11 is made by pressing the sheet of iron or iron alloy into a shape that has, around a rectangular area, bent pieces formed by bending at right angles. The shape of first metal sheet 11 thus made is such that plate part 11A is rectangular corresponding to a shape of the end face of battery stack 2, namely, the outline of prismatic battery cell 1 and connects with, at its four sides, bent side pieces 11B and bent horizontal pieces 11C that surround plate part 11A. Bent side pieces 11B connect respectively with the widthwise sides of plate part 11A, while bent horizontal pieces 11C connect respectively with the upper and lower sides of plate part 11A.

Each of bent side pieces 11B is seen in a vertical plane, is connected to bind bar 4 which is closely fitted to an outer surface of bent side piece 11B, and serves as a reinforcing rib to deliver improved strength against vertical bending of end plate 3A. Bent side piece 11B is provided with through holes 11b for bolts 5A which are securing pins 5 of bind bar 4. In order for bind bar 4 of battery module 10 illustrated in FIGS. 3 and 4 to be fixed at two points of each of its ends by upper and lower bolts 5A, bent side piece 11B is provided with two vertically separated through holes 11b.

Bent side piece 11B illustrated in the horizontal sections of FIGS. 4 and 5 has metal rod 13 inserted into through hole 11b for connecting bind bar 4 to end plate 3A. Through hole 11b through which metal rod 13 passes has an inside diameter that is substantially equal to, that is to say, slightly larger than an outside diameter of metal rod 13. For connecting bind bar 4 to end plate 3A, metal rod 13 of FIG. 4 battery module 10 has each end that is passed through bent side piece 11B, but not through bind par 4.

In this connection structure, bind bar 4 is sandwiched between bolt head 5a of bolt 5A and metal rod 13, thus being fixed to end plate 3A. Metal rod 13 of FIG. 5 battery module 10 has each end that is passed both through bent side piece 11B and through bind bar 4. In this connection structure, metal rod 13 is inserted into through hole 11b of bent side piece 11B and locking hole 4a of bind bar 4 for connecting bind bar 4 to end plate 3A. Therefore, locking hole 4a of bind bar 4 has an inside diameter that is larger than the outside diameter of metal rod 13 and forms with metal rod 13 a clearance that enables end plate 3A to slightly move when end plate 3A experiences cell reaction force of battery stack 2.

Fixed to bent horizontal pieces 11C of first metal sheet 11 is an upper border of second metal sheet 12. Tubular reinforcement (=reinforcing pipe) 14 having the shape of a square cylinder is defined about each of an upper and a lower border of end plate 3A by each of bent horizontal pieces 11C, plate part 11A, and each of bending ridges (=bending projecting stripe) 12A of second metal sheet 12. In the vertical section of FIG. 3, each of bent horizontal pieces 11C of end plate 3A illustrated has an outwardly projecting terminal border welded to each of the upper border and a lower border of second metal sheet 12, thus defining square-shaped tubular reinforcement 14. The upper and lower borders of second metal sheet 12 of end plate 3A illustrated are inwardly bent to form welding tabs 12c. Each of welding tabs 12c is stacked on and welded to an inner surface of bent horizontal piece 11C. FIG. 3 battery module 10 has base plate 9 below end plate 3A, and the lower border of second metal sheet 12 is welded to base plate 9. Metal rods 13 are disposed in tubular reinforcements 14, respectively. In order for metal rod 13 to be disposed in tubular reinforcement 14, a bent width of bent horizontal piece 11C is greater than the outside diameter of metal rod 13.

Second metal sheet 12 is made by pressing the sheet of metal and is such that parallel plate part 12B is stacked on and fixed to plate part 11A of first metal sheet 11 and is provided with, at each of its sides, bending ridge 12A that extends along a width of end plate 3A. Bending ridge 12A is of shape that has riser 12b connecting with one side of top surface 12a. Because of riser 12b, top surface 12a is separated from parallel plate part 12B, and metal rod 13 is disposed on an inner side of top surface 12a. In end plate 3A of FIG. 3, top surface 12a of bending ridge 12A is connected, at its other side, to the terminal border of bent horizontal piece 11C of first metal sheet 11, defining tubular reinforcement 14 of square-cylinder shape with bent horizontal piece 11C and plate part 11A of first metal sheet 11 and top surface 12a and riser 12b of second metal sheet 12. In order for metal rod 13 to be disposed in tubular reinforcement 14, a width of top surface 12a and a width of riser 12b are each greater than the outside diameter of metal rod 13.

Second metal sheet 12 illustrated in FIG. 3 is provided with upper and lower bending ridges 12A as two lines. In this drawing, each of bending ridges 12A includes top surface 12a and riser 12b with top surface 12a connected at its one side to parallel plate part 12B by riser 12b. Top surfaces 12a, risers 12b, and parallel plate part 12B are made by pressing the single sheet of metal. Second metal sheet 12 made by bending the planar sheet of metal includes a substantially right-angled bend between top surface 12a and riser 12b and a substantially right-angled bend between riser 12b and parallel plate part 12B, with top surface 12a and parallel plate part 12B being in parallel relation. As illustrated in FIG. 3, bending ridges 12A of second metal sheet 12 has their respective risers 12b facing each other, and with the angle of the bend between top surface 12a and riser 12b and the angle of the bend between riser 12b and parallel plate part 12B being slightly greater than 90 degrees each, space between these risers 12b slightly flares heading toward top surfaces 12a. In FIG. 3, bent horizontal piece 11C of first metal sheet 11 serves as one side of tubular reinforcement 14 of end plate 3A, so that in order for square-shaped tubular reinforcement 14 to be defined by bent horizontal piece 11C and plate part 11A of first metal sheet 11 and top surface 12a and riser 12b of second metal sheet 12, bent horizontal piece 11C of first metal sheet 11 is welded to the other side of top surface 12a. It is to be noted, however, that although not illustrated, the battery module according to the present invention may have a second metal sheet that is provided with bending ridges each having risers respectively at sides of a top surface so that a tubular reinforcement is defined by both these risers, the top surface, and the plate part of the first metal sheet.

Metal rod 13 disposed in tubular reinforcement 14 is connected to securing pins 5 at both its ends. Metal rod 13 is welded to first metal sheet 11. In each of FIGS. 4 and 5, metal rod 13 of end plate 3A is welded, at each of its ends, to an inner surface of bent side piece 11B of first metal sheet 11. Metal rod 13 is welded to first metal sheet 11 before second metal sheet 12 is fixed to first metal sheet 11. Metal rod 13 may be welded, at its intermediate part, to the surface of first metal sheet 11 to be integral with first metal sheet 11.

Securing pins 5 are inserted respectively into the ends of metal rod 13, thus fixing bind bars 4 to end plate 3A. Therefore, the ends of metal rod 13 are each provided with joining hole 15 that allows insertion of securing pin 5 for joining. In each of FIGS. 4 and 5, joining hole 15 provided in each of the ends of metal rod 13 has a predetermined depth because metal rod 13 used is the cylindrical metal rod. It is to be noted, however, that for the metal pipe that is also usable as metal rod 13, a joining hole is provided in an inner surface of each of ends of the metal pipe to allow insertion of securing pin 5.

In each of FIGS. 4 and 5, bolts 5A of end plate 3A serve as securing pins 5. Therefore, each of the ends of metal rod 13 is provided with female threaded hole 15a into which male screw 5b of bolt 5A is screwed. Female threaded hole 15a provided extends axially from an end face. Bolt 5A is passed through bind bar 4 and bent side piece 11B of first metal sheet 11 and is screwed into female threaded hole 15a to fix bind bar 4 to end plate 3A. In the FIG. 4 connection structure, metal rod 13 is passed through bent side pieces 11B of first metal sheet 11, but not through bind bars 4, and bind bars 4 are each pinched between bolt head 5a and the end face of metal rod 13, thus being fixed to end plate 3A. In the FIG. 5 connection structure, metal rod 13 is passed both through bent side pieces 11B of first metal sheet 11 and through bind bars 4, and each of bolt heads 5a is closely fitted to the end face of metal rod 13, thus fixing bind bar 4 to end plate 3A.

In FIG. 3, bent horizontal pieces 11C of first metal sheet 11 respectively define an upper and a lower surface of end plate 3A. However, although not illustrated, the upper and lower surfaces of the end plate may be defined even by a second metal sheet.

Bind bar 4 is a metal sheet having the same vertical width as end plate 3A and has an inwardly bent upper border as bent part 4b. Bent part 4b is disposed on an upper surface of battery stack 2 to hold the plurality of prismatic battery cells 1 in position. Although illustrated bind bar 4 is the single metal sheet, the bind bar may include a plurality of vertically divided metal sheets or may be another reinforcing plate. Bind bar 4 has through holes that each serve as locking hole 4a allowing insertion of bolt 5A, which is securing pin 5.

Second Exemplary Embodiment

Figure 6:
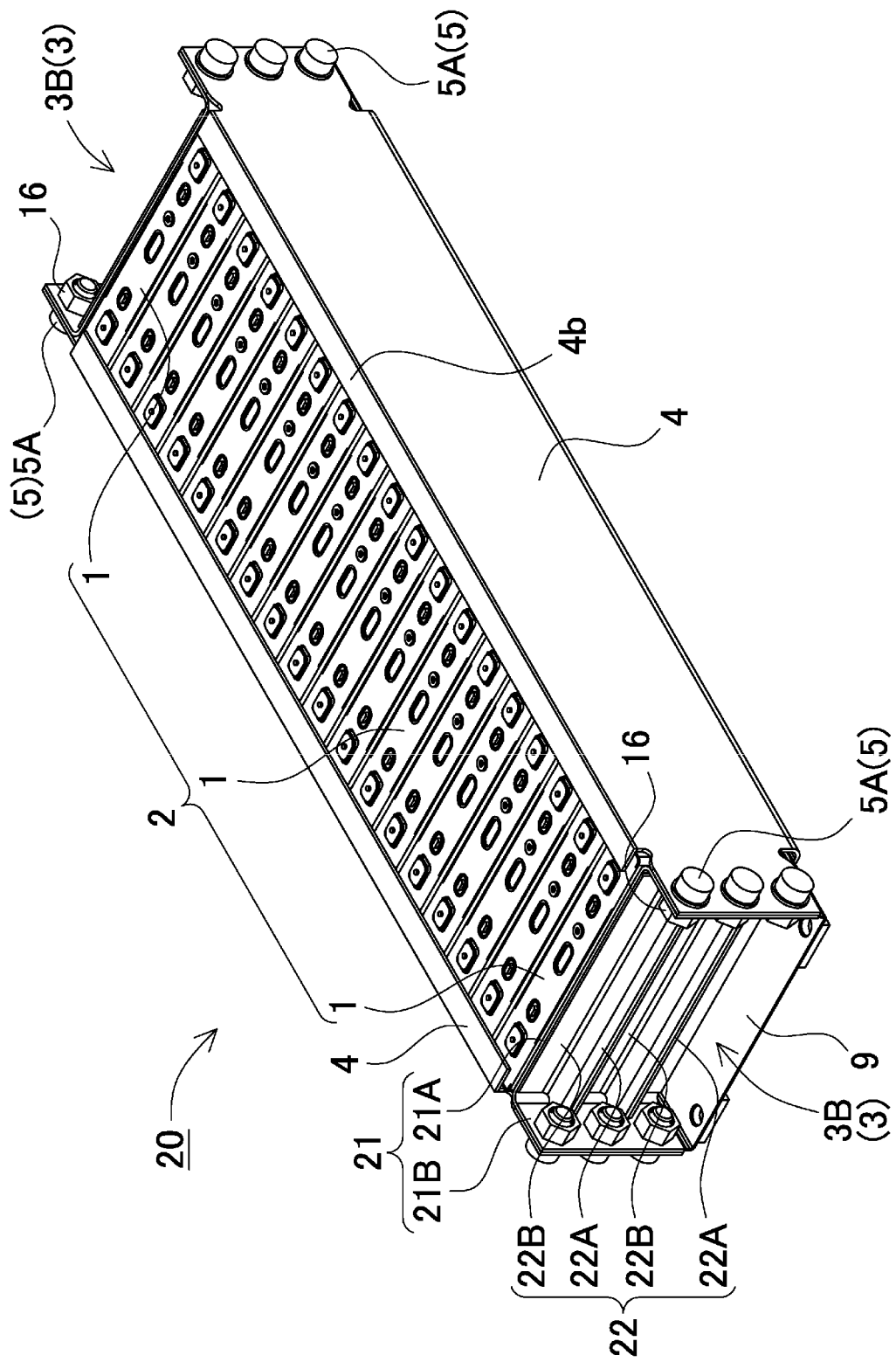
FIG. 6 is a perspective view of a battery module according to a second exemplary embodiment of the present invention.
Figure 7:
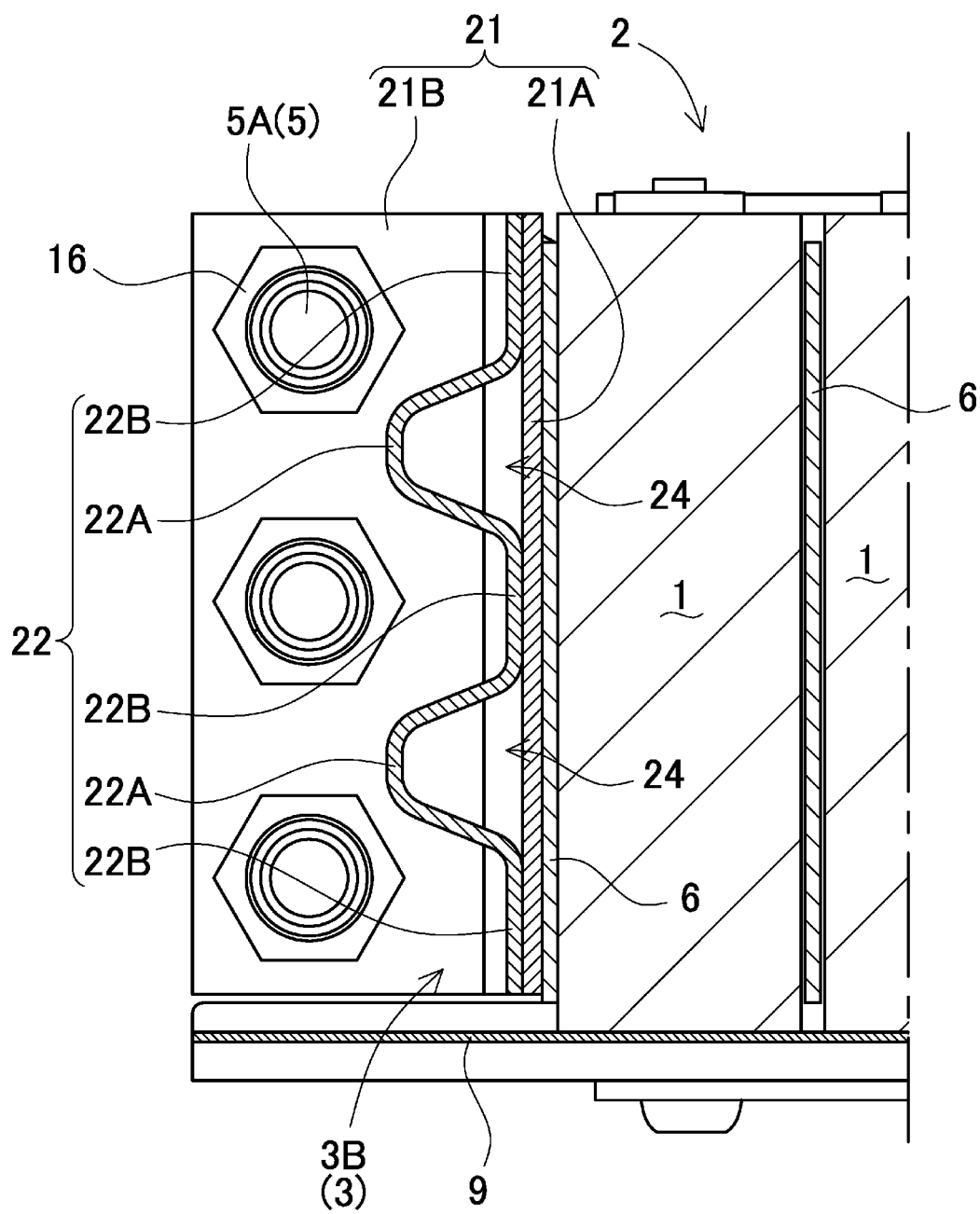
FIG. 7 is an enlarged vertical section of an end plate of the FIG. 6 battery module.

In each of the above-described examples, end plate 3 is described as being composed of first metal sheet 11, second metal sheet 12, and metal rod 13. However, these examples are not limiting. The end plate may be composed of a first metal sheet and a second metal sheet. Such an example is illustrated as a second exemplary embodiment by FIGS. 6 and 7. FIG. 6 is a perspective view of battery module 20, and FIG. 7 is a vertical section of end plate 3B of battery module 20. Battery module 20 illustrated in these drawings includes a pair of end plates 3B disposed respectively at end faces of battery stack 2 that face in a stacked direction, and bind bars 4 connecting the pair of end plates 3B to hold battery stack 2 with pressure being applied to battery stack 2. Each of end plates 3B includes first metal sheet 21 and second metal sheet 22 that are each made by pressing a sheet of metal and are partly stacked in fixed relation. First metal sheet 21 of end plate 3B is disposed closer to battery stack 2.

First metal sheet 21 is provided with, as parts positioned respectively at sides of plate part 21A, bent side pieces 21B that are obtained by bending at right angles. Plate part 21A has an outline corresponding to a shape of the end face of battery stack 2, and bent side pieces 21B are provided as the outwardly bent parts positioned respectively at the widthwise sides of plate part 21A. To be connected to bind bar 4, each of bent side pieces 21B is provided with through holes that each allow insertion of bolt 5A which is securing pin 5. The through holes provided in bent side piece 21B of illustrated first metal sheet 21 are three in number. End plate 3B has nuts 16 screwed respectively on bolts 5A that are passed through bind bar 4 and bent side piece 21B, so that bind bar 4 is fixed.

Second metal sheet 22 is provided with a plurality of parallel plate parts 22B and a plurality of bending ridges 22A that are alternated and parallel each other. Parallel plate parts 22B are stacked on plate part 21A of first metal sheet 21 and are fixed by a method such as welding. Each of bending ridges 22A is provided between parallel plate parts 22B, protruding in an outward direction of end plate 3B. The plurality of bending ridges 22A provided run parallel to each other along a width of end plate 3B. End plate 3B illustrated is provided with two bending ridges 22A, each between through holes 21b of each of bent side pieces 21B. Each of bending ridges 22A has its end edges disposed respectively on respective inner surfaces of bent side pieces 21B. Therefore, bending ridge 22A disposed between through holes 21b can have an increased height without causing an increased width of each of bent side piece 21B and thus can deliver improved strength against widthwise bending of end plate 3B.

With bending ridges 22A being mountain-shaped and with parallel plate parts 22B fixed to plate part 21A, two tubular reinforcements 24 are provided extending along the width of end plate 3B. Tubular reinforcements 24 that are tubes defined by the connected metal sheets significantly improve the strength against widthwise bending of end plate 3B, that is to say, side-to-side bending in the drawing. Illustrated end plate 3B has through hole 21b between two tubular reinforcements 24 as well as on each side of those two tubular reinforcements 24, and bind bar 4 is fixed to end plate 3B at three points by means of bolts 5A which are securing pins 5. Bent side piece 21B is uniformly connected to bind bar 4 in this structure, and two tubular reinforcements 24 enable end plate 3B to uniformly have the improved strength against bending.

Third Exemplary Embodiment

Figure 8:
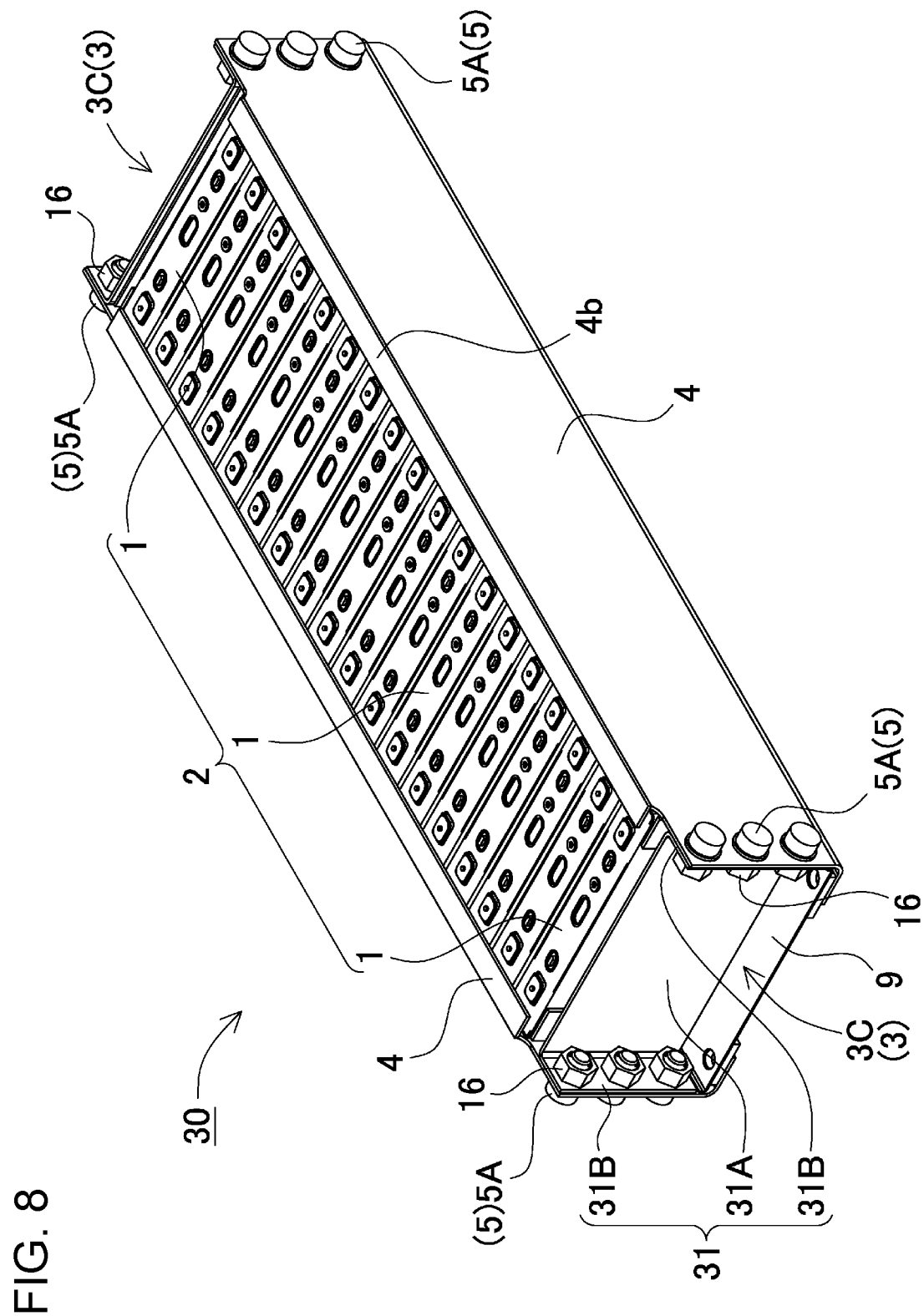
FIG. 8 is a perspective view of a battery module according to a third exemplary embodiment of the present invention.
Figure 9:
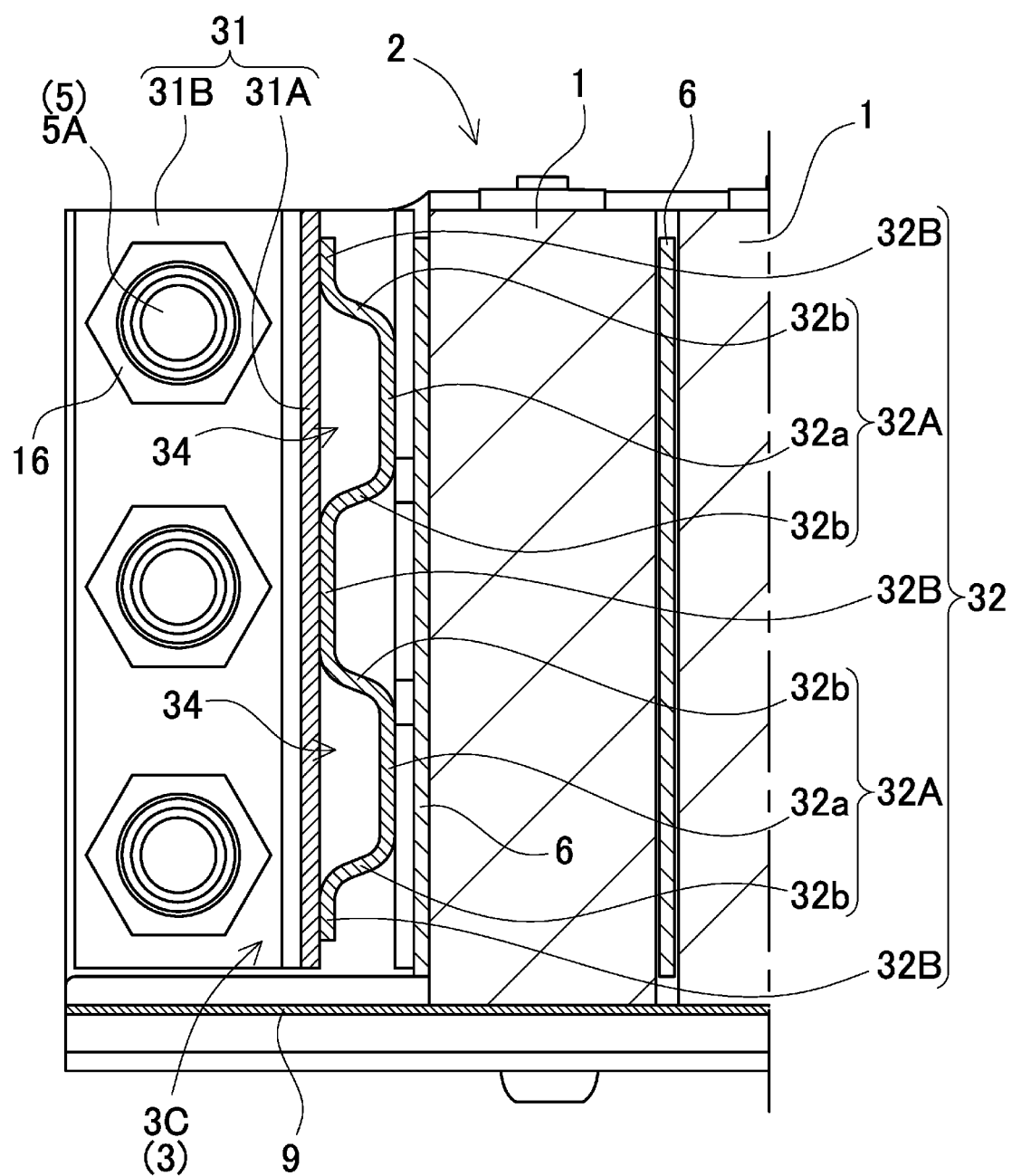
FIG. 9 is an enlarged vertical section of an end plate of the FIG. 8 battery module.

In the example of the second exemplary embodiment, first metal sheet 21 of end plate 3B of battery module 20 is disposed closer to battery stack 2. However, a second metal sheet may be disposed closer to a battery stack. Battery module 30 including end plates 3C according to the third exemplary embodiment is illustrated in such an example by FIGS. 8 and 9. FIG. 8 is a perspective view of battery module 30, and FIG. 9 is a vertical section of end plate 3C of battery module 30.

Each bending ridge 32A of second metal sheet 32 of end plate 3C illustrated in the above drawings has planar top surface 32a, and second metal sheet 32 is disposed closer to battery stack 2. Bending ridge 32A is of shape that has risers 32b provided respectively at sides of top surface 32a with each of risers 32b connecting with parallel plate part 32B. Top surface 32a has a predetermined width to have an increased area of contact with battery stack 2. If the area of contact between top surface 32a and battery stack 2 is smaller, increased pressure is applied to an area that counters cell reaction force. When prismatic battery cells 1 of battery stack 2 expand, the cell reaction force is caused and acts on top surfaces 32a. With top surface 32a of each of bending ridges 32A having the increased area, pressing force per unit area, namely, the pressure caused by the cell reaction force can be reduced. For end plate 3C having second metal sheet 32 disposed closer to battery stack 2, top surface 32a of each of bending ridges 32A has the increased width to have the increased area of contact with battery stack 2, thus reducing the pressure caused by the cell reaction force.

First metal sheet 31 is provided with, as parts positioned respectively at sides of plate part 31A, bent side pieces 31B that are obtained by bending at right angles. Bent side pieces 31B are provided as the outwardly bent parts positioned respectively at the widthwise sides of plate part 31A. For connection to bind bar 4, each of bent side pieces 31B is provided with through holes that each allow insertion of bolt 5A which is securing pin 5. The through holes provided in bent side piece 31B of illustrated first metal sheet 31 are three in number. End plate 3C has nuts 16 screwed respectively on bolts 5A that are passed through bind bar 4 and bent side piece 31B, so that bind bar 4 is fixed.

Above end plate 3C has second metal sheet 32 fixed to a battery-stack-end side of first metal sheet 31, and tubular reinforcement 34 is defined by each of bending ridges 32A and plate part 31A of first metal sheet 31, thus reinforcing end plate 3C and delivering improved strength against bending.

Vehicle Including Battery Modules

Each of the above-described battery modules is best used as a power source that supplies electric power to a motor which drives an electrically driven vehicle. Available examples of a vehicle mounted with battery modules include a hybrid or a plug-in hybrid vehicle that is driven both by an engine and by a motor, and an electric vehicle that is driven only by a motor. The battery module is used as the power source in each of these vehicles. In each of given examples, in order to provide electric power that drives the vehicle, large-capacity, high-output power supply device 100 is mounted and includes a plurality of the above-described battery modules that are connected in series or parallel, and a control circuit that is a necessary addition.

Figure 10:
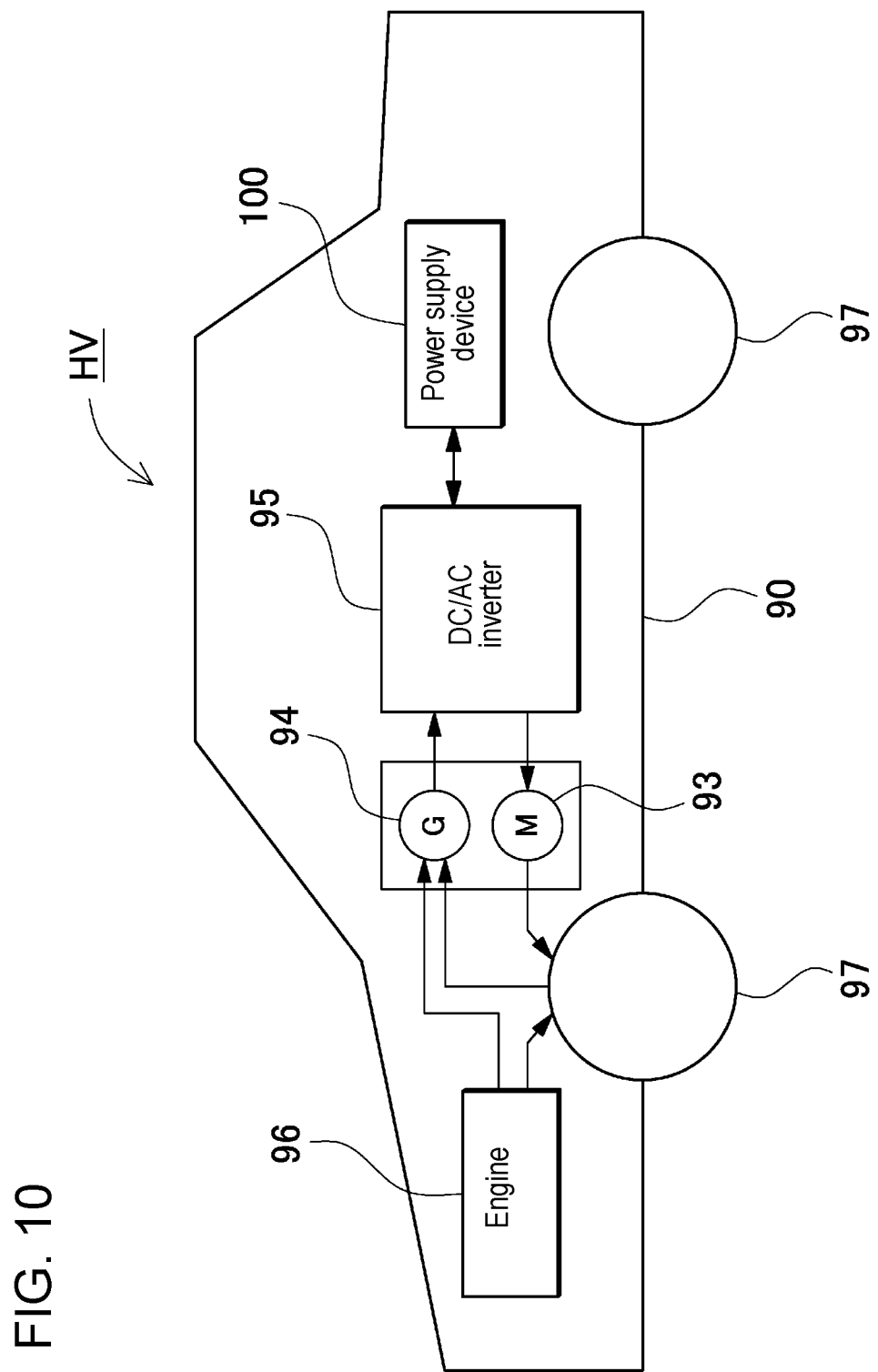
FIG. 10 is a block diagram illustrating an example in which the battery module is mounted to a hybrid vehicle that is driven by an engine and a motor.

FIG. 10 illustrates the example in which the power supply device is mounted to a hybrid vehicle that is driven both by an engine and by a motor. Illustrated vehicle HV mounted with the power supply device includes vehicle body 90, engine 96 and traction motor 93 that cause vehicle body 90 to run, wheels 97 that are driven by engine 96 and traction motor 93, power supply device 100 that supplies electric power to motor 93, and electric generator 94 that charges the battery modules of power supply device 100. Power supply device 100 is connected to motor 93 and electric generator 94 via direct current to alternating current (DC-AC) inverter 95. Vehicle HV is driven both by motor 93 and by engine 96 while the battery modules of power supply device 100 charge and discharge. Motor 93 is driven to drive the vehicle when engine efficiency is low, for example, during acceleration or on a low speed run. Motor 93 is driven when electric power is supplied from power supply device 100. Electric generator 94 is driven by engine 96 or by regenerative braking that is caused when the vehicle brakes, thus charging the battery modules of power supply device 100.

Figure 11:
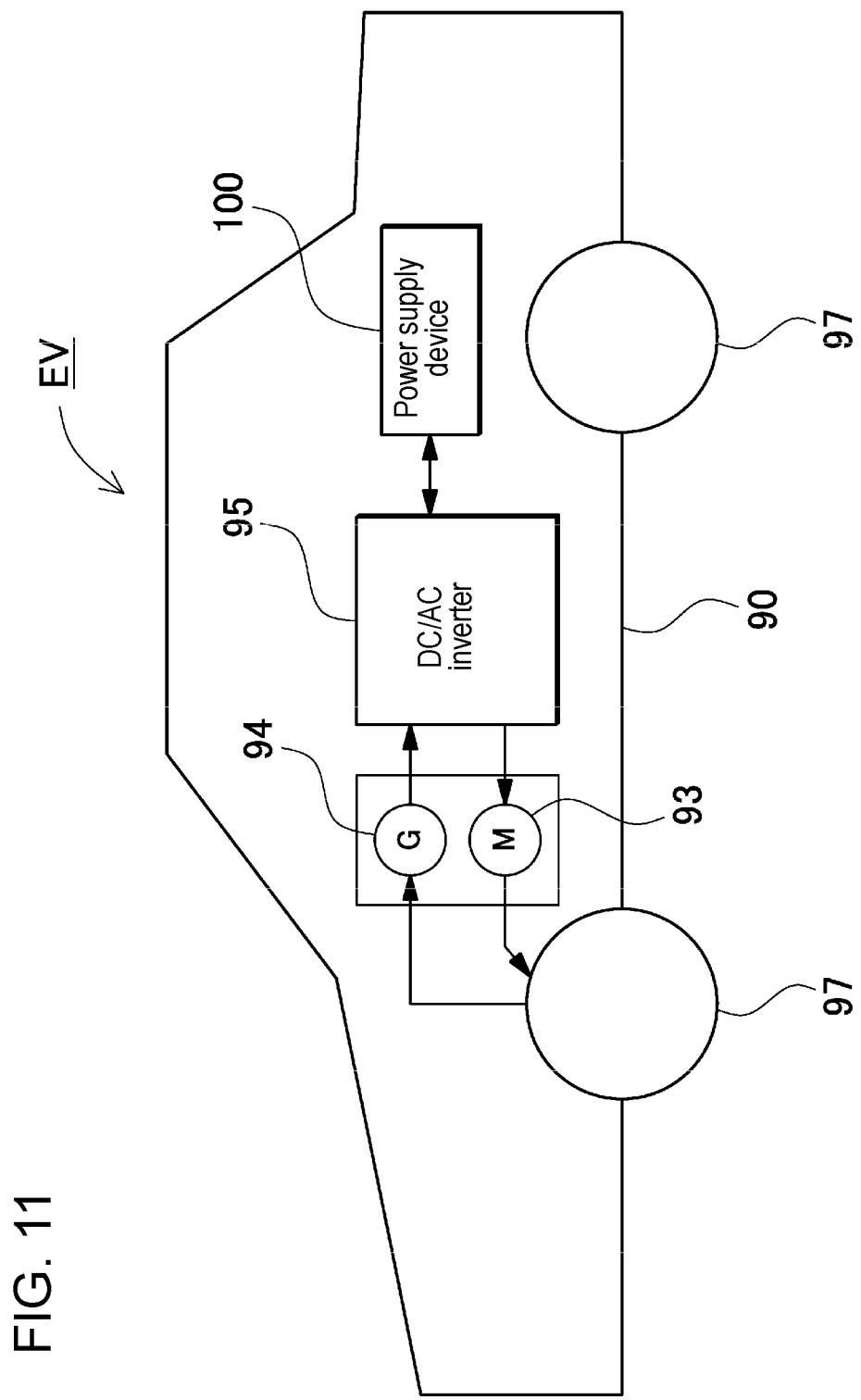
FIG. 11 is a block diagram illustrating an example in which the battery module is mounted to an electric vehicle that is driven only by a motor.

FIG. 11 illustrates the example in which the power supply device is mounted to an electric vehicle that is driven only by a motor. Illustrated vehicle EV mounted with the power supply device includes vehicle body 90, traction motor 93 that causes vehicle body 90 to run, wheels 97 that are driven by motor 93, power supply device 100 that supplies electric power to motor 93, and electric generator 94 that charges the battery modules of power supply device 100. Power supply device 100 is connected to motor 93 and electric generator 94 via DC-AC inverter 95. Motor 93 is driven when electric power is supplied from power supply device 100. Electric generator 94 is driven by energy caused during regenerative braking of vehicle EV and charges the battery modules of power supply device 100.

The exemplary embodiments may be specified by the following structures.

A battery module according to an aspect of the present invention includes battery stack 2 that includes a plurality of prismatic battery cells 1 stacked in a direction along their thicknesses, a pair of end plates 3 disposed respectively at end faces of battery stack 2 that face in a stacked direction, and bind bar 4 connected to the pair of end plates 3. Each of the pair of end plates 3 includes first metal sheet 11 and second metal sheet 12 that are partly stacked in fixed relation, and metal rod 13 disposed between first metal sheet 11 and second metal sheet 12. First metal sheet 11 includes plate part 11A having an outline corresponding to a shape of each of the end faces of battery stack 2, and bent side piece 11B provided at each of widthwise sides of plate part 11A. Second metal sheet 12 includes parallel plate part 12B stacked on and fixed to plate part 11A of first metal sheet 11, and bending ridge 12A connecting with each of sides of parallel plate part 12B and extending along widths of the pair of end plates 3. With parallel plate part 12B fixed to plate part 11A, tubular reinforcement 14 is defined on an inner side of bending ridge 12A and extends along the widths of the pair of end plates 3. Metal rod 13 is disposed in tubular reinforcement 14 and has ends that are each connected to bind bar 4.

The above battery module characteristically has the end plates that are lightweight and sufficiently strong. That is because of these reasons. Each of the end plates of the above battery module includes the first metal sheet and the second metal sheet that are stacked in fixed relation. The first metal sheet's bent side pieces provided respectively at the sides of the plate part for connection to the bind bars deliver improved strength against vertical bending. The second metal sheet's bending ridges provided respectively at the sides of the parallel plate part deliver improved strength against widthwise bending. The second metal sheet's parallel plate part is fixed to the plate part of the first metal sheet, so that the tubular reinforcement is defined on the inner side of the bending ridge, thus improving the strength against widthwise bending of the end plate. The metal rod disposed in the tubular reinforcement significantly improves the strength against bending of the end plate. The lightweight and sufficiently strong end plates are particularly important characteristics for the above battery module and can be obtained particularly with the tubular reinforcement defined by the first metal sheet and the second metal sheet that are stacked in fixed relation because the tubular reinforcement improves the strength against widthwise bending of the end plate despite being hollow.

The battery module also includes securing pin 5 fixing bind bar 4 to each of the pair of end plates 3. Metal rod 13 includes joining hole 15 for securing pin 5 in each of its ends. Securing pin 5 is passed through bind bar 4 and bent side piece 11B and is inserted in joining hole 15 of metal rod 13 to connect bind bar 4 to each of the pair of end plates 3.

The securing pin passed through the bind bar is connected to the end of metal rod to fix the bind bar to the end plate, so that the above battery module characteristically has the bind bar, the end plate, and the metal rod that are integrally and firmly connected with the metal rod also serving to fix the securing pin.

Securing pin 5 of the battery module is bolt 5A, and joining hole 15 of metal rod 13 is female threaded hole 15a. Bolt 5A is screwed into female threaded hole 15a to be fixed.

The bolt is screwed into the female threaded hole of the metal rod to fix the bind bar to the end plate, so that the above battery module characteristically has the bind bar and the end plate that are integrally and firmly fixed with the metal rod also serving as a nut into which the bolt is screwed to be fixed.

The structure in which the metal rod also serves as the nut into which the bolt is screwed to be fixed also can characteristically make the female threaded hole longer so that the bolt is screwed more deeply into the female threaded hole to be firmly fixed.

Each of the pair of end plates 3 can include a plurality of tubular reinforcements 14 that parallel each other.

The above battery module characteristically has the end plate that is made extremely tough by the plurality of the tubular reinforcements paralleling each other. The plurality of the tubular reinforcements can be provided by changing a shape of the second metal sheet when bending is carried out. Therefore, the plurality of the tubular reinforcements characteristically make the end plate tough and lightweight while being made efficiently by such simple bending.

First metal sheet 11 of the battery module also includes bent horizontal piece 11C that connects with each of an upper and a lower side of plate part 11A. Bending ridge 12A of second metal sheet 12 includes top surface 12a and riser 12b connecting with a side of top surface 12a. Bent horizontal piece 11C of first metal sheet 11 has a terminal border connected to another side of top surface 12a of bending ridge 12A. Tubular reinforcement 11 is of square-cylinder shape and is defined by bent horizontal piece 11C and plate part 11A of first metal sheet 11, and top surface 12a and riser 12b of second metal sheet 12.

Metal rod 13 of the battery module has each of the ends passed through bent side piece 11B, but not through bind bar 4, or has each of the ends passed through bind bar 4 and bent side piece 11B.

A battery module according to another aspect of the present invention includes battery stack 2 that includes a plurality of prismatic battery cells 1 stacked in a direction along their thicknesses, a pair of end plates 3 disposed respectively at end faces of battery stack 2 that face in a stacked direction, and bind bar 4 connected to the pair of end plates 3. Each of the pair of end plates 3 includes first metal sheet 21, 31 and second metal sheet 22, 32 that are partly stacked in fixed relation. First metal sheet 21, 31 includes plate part 21A, 31A having an outline corresponding to a shape of each of the end faces of battery stack 2, and bent side piece 21B, 31B that is provided at each of widthwise sides of plate part 21A, 31A and is connected to bind bar 4. Second metal sheet 22, 32 includes a plurality of parallel plate parts 22B or 32B stacked on and fixed to plate part 21A, 31A of first metal sheet 21, 31, and a plurality of bending ridges 22A or 32A that are each disposed between parallel plate parts 22B or 32B and extend along widths of the pair of end plates 3. With the plurality of parallel plate parts 22B or 32B of second metal sheet 22, 32 fixed to plate part 21A, 31A of first metal sheet 21, 31, tubular reinforcement 24, 34 is defined by plate part 21A, 31A of first metal sheet 21, 31 and each of the plurality of bending ridges 22A, 32A of second metal sheet 22, 32 and extends along the widths.

The above battery module characteristically has the end plates that are lightweight and sufficiently strong. That is because of these reasons. Each of the end plates of the above battery module includes the first metal sheet and the second metal sheet that are stacked in fixed relation. The first metal sheet's bent side pieces provided respectively at the sides of the plate part for connection to the bind bars deliver improved strength against vertical bending. The plurality of bending ridges of the second metal sheet deliver improved strength against widthwise bending. The second metal sheet's parallel plate parts are fixed to the plate part of the first metal sheet, so that the tubular reinforcement extending along the widths is defined by the plate part of the first metal sheet and each of the bending ridges of the second metal sheet, thus improving the strength against widthwise bending of the end plate. The lightweight and sufficiently strong end plates are characteristic of the above battery module and can be obtained particularly with the hollow tubular reinforcements that extend along the widths and are defined by the first and second metal sheets stacked in fixed relation, improving the strength against widthwise bending of the end plate.

First metal sheet 11, 21 of each of the pair of end plates 3A or 3B of the battery module is disposed at each of the end faces of battery stack 2 to face battery stack 2.

Second metal sheet 32 of each of the pair of end plates 3C of the battery module is disposed at each of the end faces of battery stack 2 to face battery stack 2.

According to another aspect, a vehicle includes any one of the above-described battery modules, traction motor 93 that is supplied with electric power from the battery module, vehicle body 90 mounted with the battery module and motor 93, and wheel 97 that is driven by motor 93 to run vehicle body 90.

INDUSTRIAL APPLICABILITY

A battery module according to the present invention can be suitably used in a power supply device for a hybrid vehicle, a plug-in hybrid vehicle, an electric vehicle, or the like. A vehicle including this battery module can be suitably used as a hybrid vehicle, a plug-in hybrid vehicle, an electric vehicle, or the like.

The invention claimed is:

1. A battery module comprising:
a battery stack that includes a plurality of prismatic battery cells stacked in a direction along thicknesses of the plurality of prismatic battery cells;
a pair of end plates disposed respectively at end faces of the battery stack in a stacked direction of the battery stack; and
a bind bar connected to the pair of end plates,
wherein
each of the pair of end plates includes:
a first metal sheet and a second metal sheet that are partly stacked in fixed relation; and
a metal rod disposed between the first metal sheet and the second metal sheet,
the first metal sheet includes:
a plate part having an outline corresponding to a shape of each of the end faces of the battery stack; and
a bent side piece provided at each of widthwise sides of the plate part,
the second metal sheet includes:
a parallel plate part stacked on and fixed to the plate part of the first metal sheet; and
a bending ridge connecting with each of sides of the parallel plate part and extending along widths of the pair of end plates,
with the parallel plate part fixed to the plate part, a tubular reinforcement is defined on an inner side of the bending ridge and extends along the widths of the pair of end plates, and
the metal rod is disposed in the tubular reinforcement and has ends that are each connected to the bind bar,
wherein each of the pair of end plates includes a plurality of the tubular reinforcements paralleling each other, and
wherein,
the first metal sheet further includes a bent horizontal piece connecting with each of an upper side and a lower side of the plate part,
the bending ridge of the second metal sheet includes a top surface and a riser connecting with a side of the top surface,
the bent horizontal piece of the first metal sheet has a terminal border connected to another side of the top surface of the bending ridge, and the tubular reinforcement is of square-cylinder shape and is defined by the bent horizontal piece and the plate part of the first metal sheet, and the top surface and the riser of the second metal sheet.

2. The battery module according to claim 1,
further comprising a securing pin fixing the bind bar to each of the pair of end plates,
wherein
the metal rod includes a joining hole for the securing pin in each of ends of the metal rod, and
the securing pin is passed through the bind bar and the bent side piece and is inserted in the joining hole of the metal rod to connect the bind bar to each of the pair of end plates.

3. The battery module according to claim 2, wherein:
the securing pin is a bolt;
the joining hole of the metal rod is a female threaded hole; and
the bolt is screwed into the female threaded hole to be fixed.

4. The battery module according to claim 1,
wherein each of the ends of the metal rod is passed through the bent side piece, but not through the bind bar, or is passed through the bind bar and the bent side piece.

5. The battery module according to claim 1,
wherein the first metal sheet of each of the pair of end plates is disposed at each of the end faces of the battery stack to face the battery stack.

6. The battery module according to claim 1,
wherein the second metal sheet of each of the pair of end plates is disposed at each of the end faces of the battery stack to face the battery stack.

7. A vehicle comprising:
the battery module according to claim 1;
a traction motor that is supplied with electric power from the battery module;
a vehicle body mounted with the battery module and the traction motor; and
a wheel that is driven by the traction motor to run the vehicle body.

8. A battery module comprising:
a battery stack that includes a plurality of prismatic battery cells stacked in a direction along thicknesses of the plurality of prismatic battery cells;
a pair of end plates disposed respectively at end faces of the battery stack in a stacked direction of the battery stack; and
a bind bar connected to the pair of end plates,
wherein
each of the pair of end plates includes a first metal sheet and a second metal sheet that are partly stacked in fixed relation,
the first metal sheet includes:
a plate part having an outline corresponding to a shape of each of the end faces of the battery stack; and
a bent side piece provided at each of widthwise sides of the plate part, the bent side piece being connected to the bind bar,
the second metal sheet includes:
a plurality of parallel plate parts stacked on and fixed to the plate part of the first metal sheet; and
a plurality of bending ridges that are each disposed between the parallel plate parts, the plurality of bending ridges extending along widths of the pair of end plates, and with the plurality of parallel plate parts of the second metal sheet fixed to the plate part of the first metal sheet, a tubular reinforcement is defined by the plate part of the first metal sheet and each of the plurality of bending ridges of the second metal sheet and extends along the widths, wherein each of the pair of end plates includes a plurality of the tubular reinforcements paralleling each other, and wherein, the first metal sheet further includes a bent horizontal piece connecting with each of an upper side and a lower side of the plate part, the bending ridge of the second metal sheet includes a top surface and a riser connecting with a side of the top surface, the bent horizontal piece of the first metal sheet has a terminal border connected to another side of the top surface of the bending ridge, and the tubular reinforcement is of square-cylinder shape and is defined by the bent horizontal piece and the plate part of the first metal sheet, and the top surface and the riser of the second metal sheet.

9. The battery module according to claim 8,
wherein the first metal sheet of each of the pair of end plates is disposed at each of the end faces of the battery stack to face the battery stack.

10. The battery module according to claim 8,
wherein the second metal sheet of each of the pair of end plates is disposed at each of the end faces of the battery stack to face the battery stack.

11. A vehicle comprising:

the battery module according to claim 8;

a traction motor that is supplied with electric power from the battery module;

a vehicle body mounted with the battery module and the traction motor; and a wheel that is driven by the traction motor to run the vehicle body.

\* \* \* \* \*